(12) United States Patent
Kovac

(10) Patent No.: US 6,433,875 B1
(45) Date of Patent: Aug. 13, 2002

(54) MEASURING DEVICE FOR MEASURING THE ACCURACY OF THE POSITION AND TRACK OF A MOVING MACHINE ELEMENT

(75) Inventor: Igor Kovac, Radomlje (SI)

(73) Assignee: Institut für Fertigungstechnik Technische Universität Graz O. Univ. -Prof. Dipl. -Ing. Dr. Techn Adolf Frank, Graz (AT)

( * ) Notice: Subject to any disclaimer, the term of this patent is extended or adjusted under 35 U.S.C. 154(b) by 0 days.

(21) Appl. No.: 09/299,216

(22) Filed: Apr. 22, 1999

(30) Foreign Application Priority Data

Apr. 25, 1998 (EP) ............................... 98107582

(51) Int. Cl.⁷ .............................. G01B 11/02
(52) U.S. Cl. ............................ 356/498; 33/707; 33/710
(58) Field of Search ................. 356/498, 508; 33/707, 710; 73/1.81, 1.79

(56) References Cited

U.S. PATENT DOCUMENTS

| | | | |
|---|---|---|---|
| 4,120,093 A | 10/1978 | Spies | |
| 4,549,354 A | 10/1985 | Affa et al. | |
| 4,631,830 A | * 12/1986 | Rieder et al. | 33/125 R |
| 4,877,325 A | 10/1989 | Weule et al. | |
| RE33,774 E | * 12/1991 | Gurny | 33/503 |
| 5,333,386 A | * 8/1994 | Breyer et al. | 33/1 M |
| 5,392,384 A | 2/1995 | Tounai et al. | |
| 5,533,271 A | 7/1996 | Callaghan, Jr. | |
| 5,633,707 A | * 5/1997 | Seemann | 356/35.5 |
| 5,767,380 A | 6/1998 | Haas | |

FOREIGN PATENT DOCUMENTS

| | | |
|---|---|---|
| DE | 37 10 068 | 10/1987 |
| DE | 43 13 318 | 6/1994 |
| EP | 0 533 949 | 3/1993 |
| EP | 0 615 110 | 9/1994 |
| EP | 0 729 005 | 8/1996 |
| WO | WO 88/06271 | 8/1988 |

OTHER PUBLICATIONS

Igor Kovac et al., "High Precision Measuring Equipment for Testing and Calibration of Anthropoidic Mechanism Devices," published by the 29th International Symposium on Robotics held in Birmingham England, published in the time frame Apr. 27, 1998 to May 1, 1998, four pages.

Von Hans–Heinrich Schussler, "Neue Moglichkeiten Des Laser–Einsatzes in der Industriellen Messtechnik," Messen und Ueberwachen, Apr. 1989, pp. 4–14.

Pending Patent Application No. 09/179,214, Inventor: Tondorf et al., Filing Date: Oct. 23, 1998—Assigned to Johannes Heidenhain GmbH.

* cited by examiner

*Primary Examiner*—Frank G. Font
*Assistant Examiner*—Phil Natividad
(74) *Attorney, Agent, or Firm*—Brinks Hofer Gilson & Lione

(57) ABSTRACT

A measuring system for measuring the accuracy of the position and track of a machine element moved along a predetermined track. The system includes a predetermined track along which a machine element moves relative thereto and a measuring device for measuring the position of the machine element along the track. The track has a guide of the measuring device, on which a carriage is guided along the track, wherein the machine element can be fastened to the carriage. A component of the measuring device is fastened on the carriage and a drive integrated with the measuring device moves the carriage in a controlled manner along the guide into predetermined positions and at predetermined speeds.

13 Claims, 4 Drawing Sheets

MEASURING DEVICE FOR MEASURING THE ACCURACY OF THE POSITION AND TRACK OF A MOVING MACHINE ELEMENT

Applicant claims, under 35 U.S.C. §119, the benefit of priority of the filing date of Apr. 25, 1998 of a European patent application, copy attached, Ser. No. 98107582.3, filed on the aforementioned date, the entire contents of which are incorporated herein by reference.

BACKGROUND OF THE INVENTION

1. Field of the Invention

The present invention relates to a measuring device for measuring the accuracy of the position and track of a machine element moved along a predetermined linear track, having a length measuring device for measuring the position of the machine element along the linear track.

2. Discussion of Related Art

The measuring of industrial robots is gaining increasing importance in connection with the continuing shifts in computer-integrated production. The demands on the accuracy of position and tracks made in actual use are, as a rule, not met without prior measuring and calibration of each individual robot specimen. At present, a robot-like structure with several rotary axes is also increasingly employed as a measuring machine. Such a measuring machine can be used in the same way as a normal coordinate-measuring machine for the measuring of workpieces. But it can be used particularly advantageously for measuring and calibrating industrial robots, such as has been described in EP 0 615 110 B1 and EP 0 533 949 A1, for example.

As a rule, such robot-like measuring machines must also be measured and calibrated prior to being used.

A measuring device for measuring the position and track accuracy of a robot on which the invention is based is described in DE 37 10 068 C2. The positioning accuracy of a tool receptacle (end effector) of the robot is measured in a contactless manner by means of a laser alignment measuring device. A laser interferometer, an optical measuring head with position-sensitive detectors and an evaluation unit are parts of this measuring device. The optical measuring head is fastened on the tool receptacle of the robot or of a machine tool. The straightness of the laser beam exiting the interferometer is used as a reference. The measuring head is moved along this laser beam for the measurement. In the process, the measuring device registers kinematic characteristic values as well as geometric characteristic values. Deviations from the predetermined track along the laser beam are measured by means of the interferometer and are measured transversely in respect to it by means of the position-sensitive detectors. A computer takes over the measured values and calculates robot-specific characteristic values from them.

The disadvantage of this measuring device is that for many applications these characteristic values cannot be measured with sufficient precision. Moreover, this measuring device requires a drive of the machine element to be tested. Thus, an automatic measurement of measuring machines that do not have an individual drive is not possible.

SUMMARY OF THE INVENTION

One aspect of the present invention regards a measuring system for measuring the accuracy of the position and track of a machine element moved along a predetermined track. The system includes a predetermined track along which a machine element moves relative thereto and a measuring device for measuring the position of the machine element along the track. The track has a guide of the measuring device, on which a carriage is guided along the track, wherein the machine element can be fastened to the carriage. A component of the measuring device is fastened on the carriage and a drive integrated with the measuring device moves the carriage in a controlled manner along the guide into predetermined positions and at predetermined speeds.

A second aspect of the present invention regards a measuring system for measuring the accuracy of the position and track of a machine element, which is seated, displaceable and/or rotatable in several axes in space. The measuring system includes a guide that predetermines a track in space and along which a carriage is guided along the track. A component of a measuring device is fastened on the carriage for measuring the position of the carriage along the track and a drive is integrated with the measuring device that displaces the carriage in a controlled manner along the guide into predetermined positions and at predetermined speeds. The carriage is rigidly coupled with the machine element in a plurality of axial directions to be tested, in which the machine element is seated, displaceable and/or rotatable in space.

One advantage and object of each aspect of the present invention is to provide a measuring system for measuring the accuracy of the position and track of a moved machine element, which can be flexibly employed, has a high degree of measuring accuracy, and with which it is also possible in a simple manner to test and calibrate measuring machines which do not have an individual drive.

Another advantage and object of each aspect of the present invention is to allow for the measurement and calibration of industrial robots, as well as of manually guided and in particular robot-like measuring machines, wherein the automation of the measuring and calibrating method is made possible. With constant orientation, the position and track accuracy, and in particular the accurate reproducibility, can be registered in a highly accurate manner, since the moving machine element to be tested is rigidly moved along the measuring track by the measuring device itself. In this case a change in the orientation cannot occur at all, or respectively only to a negligible extent.

Further objects, advantages and details of the measuring system according to the invention will become apparent from the ensuing description of an exemplary embodiment in conjunction with the accompanying drawings.

DESCRIPTION OF THE PREFERRED EMBODIMENT

Figure 1:
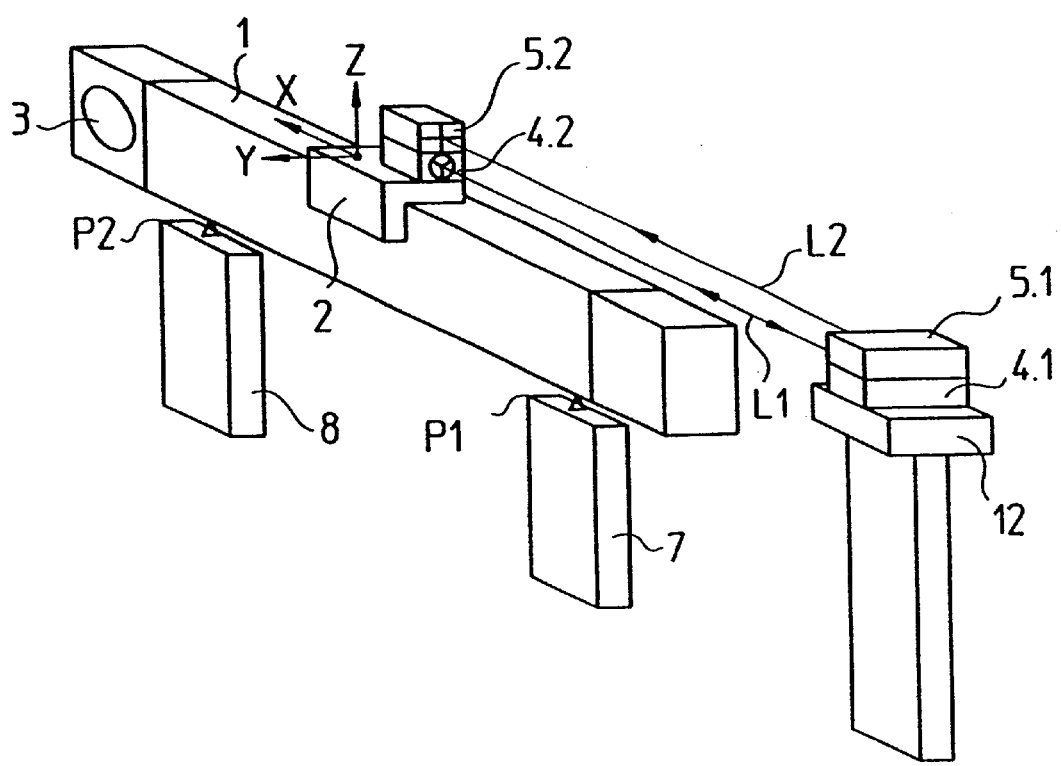
FIG. 1 is a schematic plan view of a measuring system according to the present invention.

The principle of the measuring system is schematically represented in FIG. 1. The main components of the mobile measuring system are a rigid linear guide 1, a carriage 2, a drive 3 for the carriage 2, a length measuring device 4 and a laser alignment measuring device 5.

Figure 2:
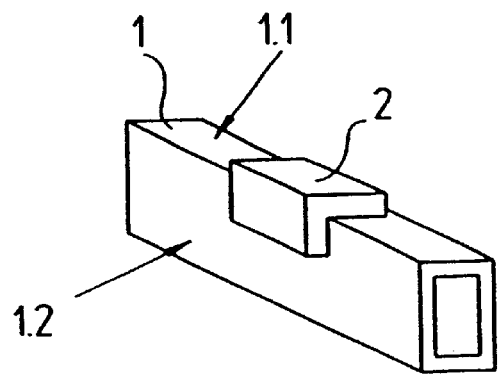
FIG. 2 shows a perspective view of detail of the linear guide of the measuring system of FIG. 1.

The linear guide 1 preferably is a profiled ceramic section, as represented in a sectional view in FIG. 2. The carriage 2 is guided on the surfaces 1.1 and 1.2 of the linear guide 1 via air bearings, in particular prestressed air bearings. The straightness of the guide surfaces 1.1 and 1.2 has been precisely provided, so that the linear guide 1 constitutes a highly accurate straight reference line, along which the carriage 2 is guided. The linear guide 1 and the air bearings are designed in such a way that angular deviations of the carriage 2 because of elasticity are less than the required data regarding the constancy of the orientation of the machine element to be measured.

The length measuring device 4 is used for measuring the position of the carriage 2 along the linear guide 1 (X direction), and the laser alignment measuring device 5 for registering transverse deviations of the carriage 2 (Y and Z directions).

The length measuring device is a laser interferometer 4 with a stationary measuring head 4.1 and a triple reflector 4.2. The measuring head 4.1 has been placed independently of the linear guide 1, and the laser beam L1 of the measuring head 4.1 works together in a known manner with the triple reflector 4.2 fastened on the carriage 2. The position of the carriage 2 in the X direction, i.e. along the linear guide 1, can be measured with high accuracy by means of the laser interferometer 4.

In a manner not represented, another length measuring device can also be used instead of the interferometer 4. An absolute or an incremental scale, which is fastened on the linear guide 1 and is scanned by a scanner head fastened on the carriage 2, is particularly advantageous.

The laser alignment measuring device 5 is used for measuring transverse deviations of the carriage 2. In a known manner, it consists of a stationary laser 5.1, which emits a laser beam L2 to at least one position-sensitive detector 5.2 of the carriage 2. Such a laser alignment measuring device is described in DE 37 10 068 C2, so that further explanations can be omitted.

In a manner not represented it is also possible to employ a laser alignment measuring device, wherein the laser 5.1, as well as the position-sensitive detector 5.2 are together arranged stationary. For reversing the laser beam L2, a special optical reversing device is exclusively arranged here on the carriage 2. Such a laser alignment measuring device is described in DE 43 13 318 C2, so that further explanations can be omitted.

In the particularly advantageous embodiment represented, the stationary component 5.1 of the laser alignment measuring device is arranged independently of the linear guide 1. This has the advantage that deviations in the two directions of Y, Z, which are caused by extraneous forces and moments, can be measured with extreme accuracy. These forces can also cause a displacement of the linear guide 1 itself. Tests have shown that displacements in the Y and Z direction, which cannot be disregarded, occur here, but displacements of the linear guide 1 in the X direction are negligibly small. For this reason it is alternately possible to fasten a scale for measuring the carriage position in the X direction also directly on the linear guide 1.

Figure 3:
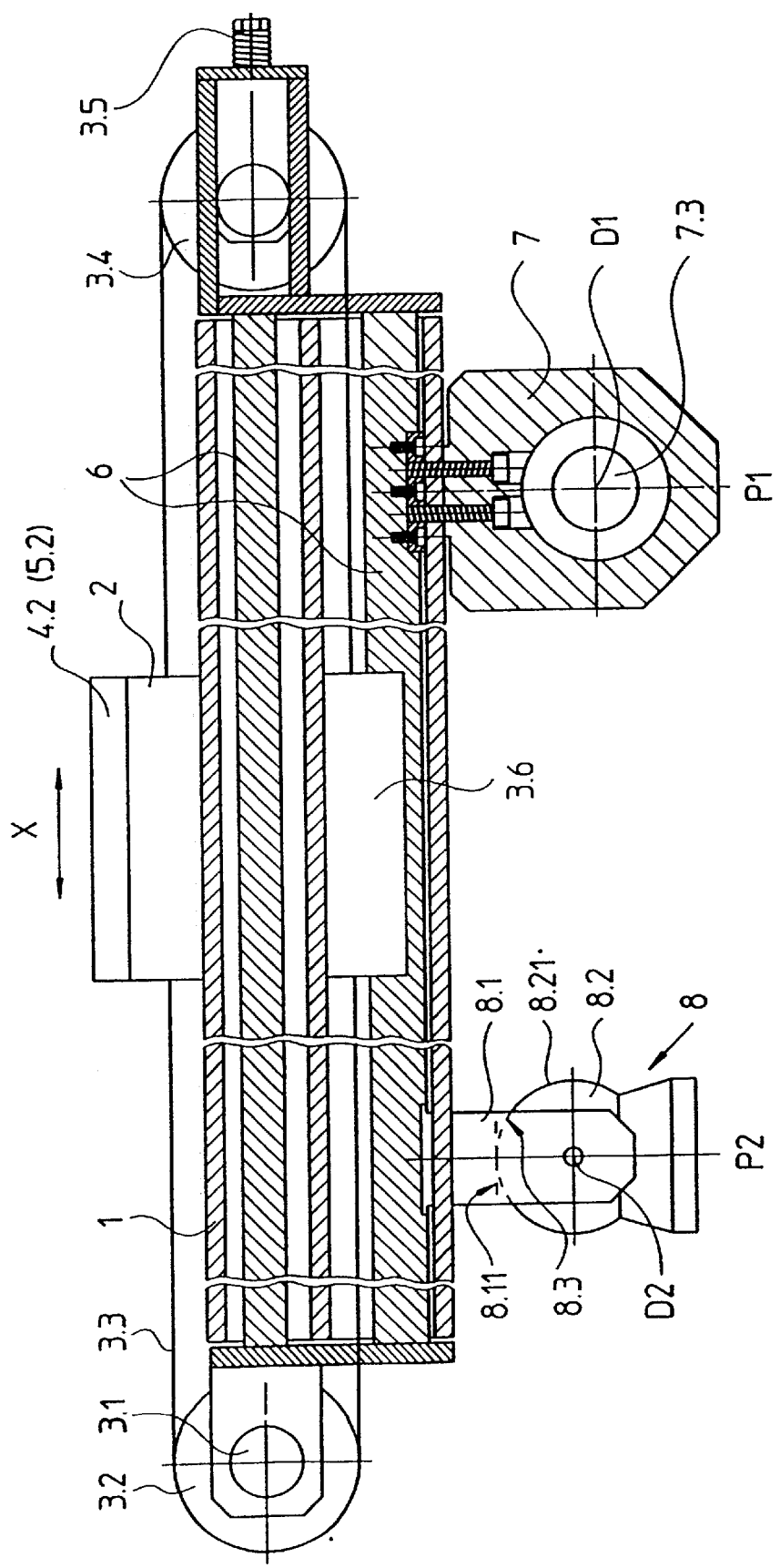
FIG. 3 is a sectional view through the linear guide of the measuring system of FIGS. 1 and 2.

The structural design of the linear guide 1 is represented in a sectional view in FIG. 3. As already explained and represented in FIG. 2, the linear guide 1 consists of a hollow profiled body, wherein the carriage 2 is guided on two surfaces 1.1. and 1.2 of the profile, which extend perpendicularly with respect to each other.

The carriage 2 is moved along the linear guide 1 by means of the drive 3. The drive 3 consists of a motor 3.1 driving a drive roller 3.2. The drive roller 3.2 in turn drives a steel belt 3.3, which is reversed as an endless belt by means of a second roller 3.4. The carriage 2 is rigidly fastened on the steel belt 3.3. The roller 3.4 is prestressed in the longitudinal direction of the linear guide 1 by means of a spring 3.5 for tensing the steel belt 3.3. A compensating weight 3.6 is fastened on the steel belt 3.3 opposite the carriage 2 for weight compensation.

It is also possible to employ another arrangement in place of the represented drive 3, for example a linear motor.

All of the components 3.1 to 3.6 of the drive 3 are attached to a separate support 6. In order to deform the linear guide 1 as little as possible by means of the components 3.1 to 3.6 of the drive 3, the support 6 is arranged in the hollow space of the linear guide 1 and is exclusively supported at the two Bessel points P1, P2 of the linear guide 1. A rigid connection between the support 6 and the linear guide 1, or respectively a mounting element 7, is provided at one of these Bessel points PI, and at the other Bessel point P2 only a support on the linear guide 1, or respectively a mounting element 8 in the form of a linear bearing, is provided, so that a displacement (compensating movement) between the support 6 and the linear guide 1 in the longitudinal direction X is made possible. This displacement possibility is required so that no constraining forces based on different expansion act on the linear guide 1.

The compensating weight 3.6 is guided on the support 6 in the longitudinal direction X of the linear guide 1. A particularly stable and light construction is obtained if the support 6 consists of several rods. The rollers 3.2 and 3.4 as well as the motor 3.1 are fastened at the end of one rod, and the compensating weight 3.6 is guided on further rods, which are arranged spaced apart from the first rod in the Z direction.

So that the measuring system in accordance with the invention can be flexibly employed, mounting elements 7 and 8 have been attached to the linear guide 1. The mounting elements 7 and 8 support the linear guide 1, again exclusively at the Bessel points P1, P2. The mounting element 8 is again designed as a linear bearing compensating in the X direction, in that an element 8.1 of the mounting element 8, which is rigidly fastened on the linear guide 1, has a sliding surface 8.11, and an element 8.2, which can be displaced in respect to it, also has a corresponding sliding surface 8.21. The linear guide 1 can be placed on, or respectively fastened to, a stationary base, a stationary machine element or also on a movable machine element, for example, by means of the mounting elements 7 and 8.

In the example represented, the mounting elements 7, 8 are specially designed for making it possible to set up the linear guide 1 in any arbitrary manner in space and to take measurements along a straight reference line at any arbitrary location in space. To this end, the mounting elements 7 and 8 used for supporting the linear guide 1 respectively have rotary bearings 7.3 and 8.3 with axes of rotation D1, D2. The rotary bearing 7.3 consists of a pin extending in the Y direction which, after the desired inclination has been set, can be clamped in order to make a fixation in place possible. The rotary bearing 8.3 is formed by the cooperation between the level sliding surface 8.11 with a spherical sliding surface 8.21 of the element 8.2, however, it can also be a separate rotary bearing in the element 8.2. Any arbitrarily inclined position of the linear guide 1 is possible by means of further support elements 9, 10 represented in FIG. 3, which are fastened on the element 8.2 of the mounting element 8, and by a support element 11 on the mounting element 7.

The stationary element 5.1 of the laser alignment measuring device 5, as well as the measuring head 4.1 are fastened on a pivotable holder 12 which can be fixed in place, so that the laser beams L1, L2 of the X direction can be tracking in accordance with the inclined position of the linear guide 1.

To test a robot-like coordinate-measuring machine 150 or an industrial robot with six degrees of freedom, the end effector 15 (FIGS. 4 and 5) is rigidly coupled with the carriage 2, for which purpose a retainer 16 is provided on the carriage 2.

It is essential that the coupling between the carriage 2 and the end effector 15 of the machine 150 to be tested is done rigidly in the axes—for example axes of rotation D1, D2, D3—or respectively the coordinate devices, in which the track accuracy of the machine 150 is intended to be tested. The movement of the carriage 2, which is predetermined under computer control, needs to be transferred exactly to the axes D1, D2, D3 of the machine 150 to be tested, it must not be compensated in the retainer 16.

If a robot or a measuring machine with fewer than six degrees of freedom is to be tested by means of the measuring device in accordance with the invention, the degrees of freedom which are still lacking for coupling can be created by additional guides, or respectively joints, of coupling mechanisms between the carriage 2 and the end effector 15. These can then be a component of the measuring device and can be embodied as highly accurate air bearings.

A laser alignment measuring device 5, with which a particularly compact structure as well as great measuring accuracy can be achieved, is described as the alignment measuring device in the example. If the exterior forces are negligibly small, the alignment measuring device 5 can also be omitted in a manner not represented. Furthermore, a different optical or also a mechanical alignment measuring device, such as a collimator system, for example, or a system operating in accordance with the wire method, can also be employed for measuring the transverse deviation Y, Z.

By means of the described steps, an extremely solid and highly accurately measuring, as well as transportable measuring device is created for testing and calibrating machines, in particular of industrial robots or measuring machines 150. For testing, the machine element 15 to be tested is connected with the carriage 2, and the carriage 2 is placed under computer control via the drive 3 into preselected positions along the linear guide 1. By means of this it is possible to approach a preselected position several times in a highly accurate, reproducible manner, so that an automated testing of the positioning and track accuracy, and in particular of the repeat accuracy of the machine 150 to be tested, is possible at a constant orientation. The required movements can also take place in a program controlled manner at different speeds and accelerations, so that as a whole static and dynamic tests can be performed in an automated manner.

Figure 4:
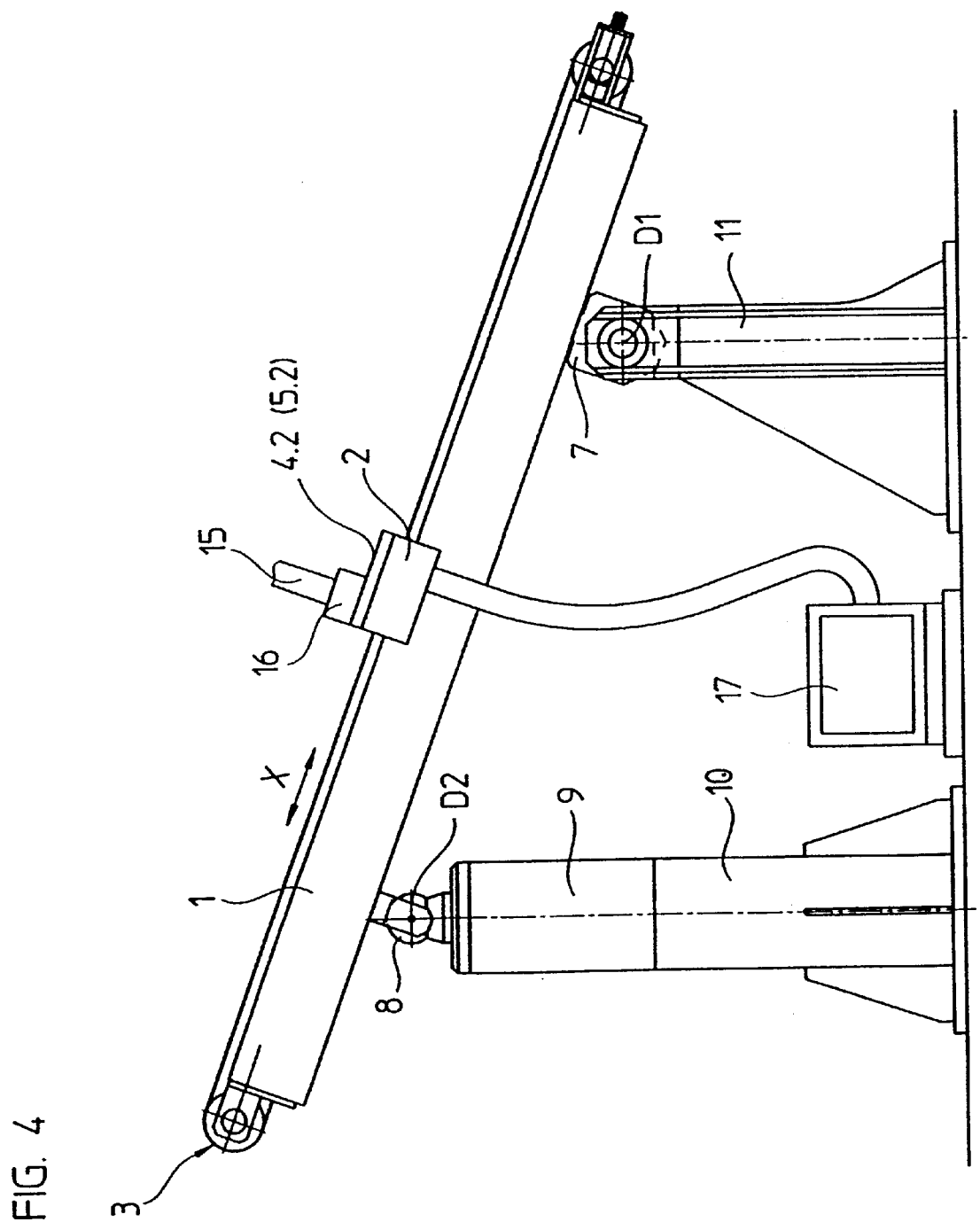
FIG. 4 shows a side view of a measuring system according to the present invention.
Figure 5:
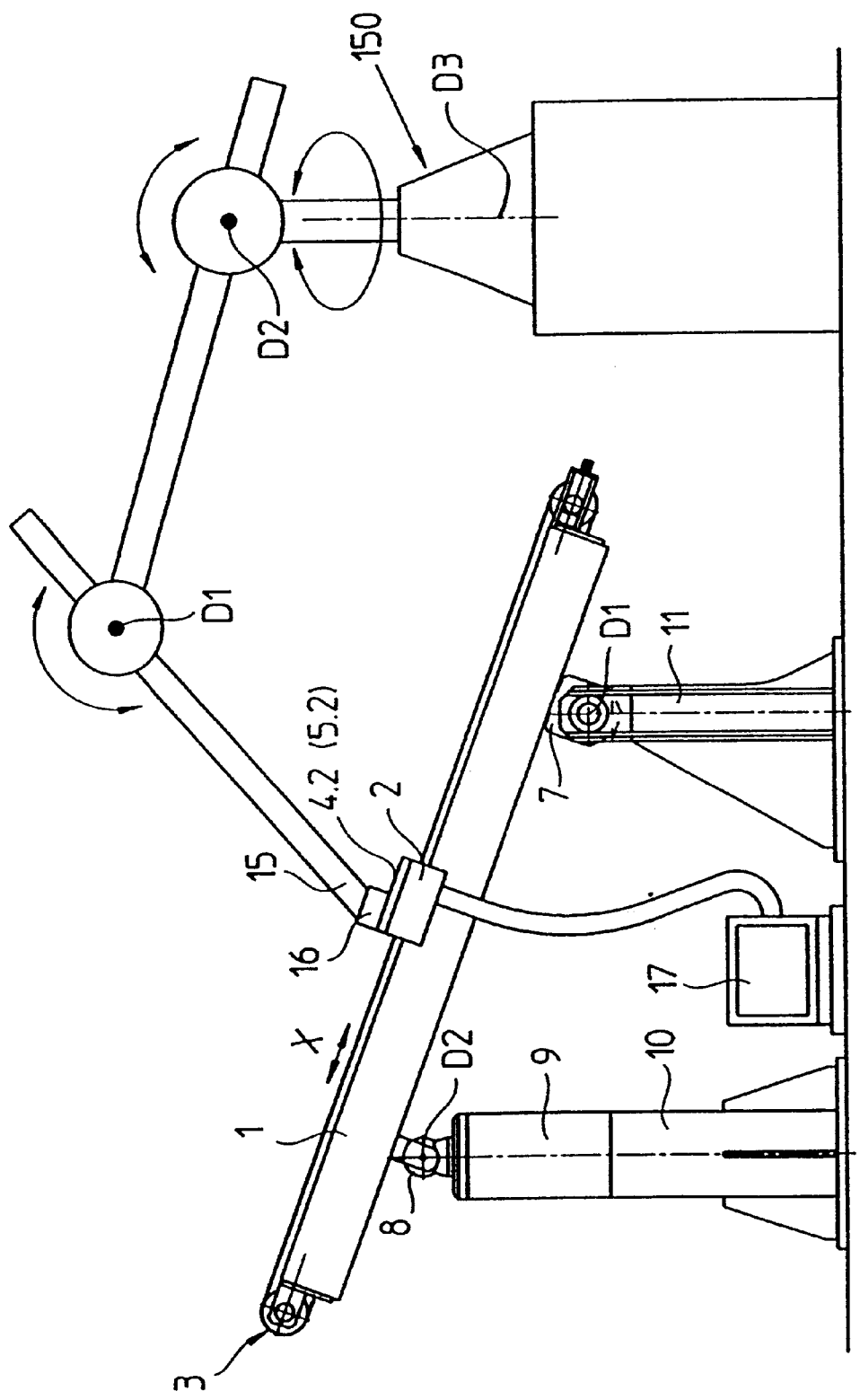
FIG. 5 shows a side view of the measuring system of FIG. 4 connected to a measuring robot.

For calibration and evaluation of the measured values, the path measuring systems 4 and 5 of the measuring system, as well as the path measuring systems of the machine to be tested are together connected to an evaluation unit, in particular a computer 17 (FIG. 4). The instantaneous measuring values of all path measuring devices are taken up by the computer 17 at the same time, and are compared after appropriate coordinate transformation. This evaluation is known per se and will therefore not be described in greater detail.

The areas that have been identified as Bessel points P1, P2 in the above description are also called Bessel's points in the technical field. They define the length of a ruler of the length 1, over which it is to be supported in order to minimize bending because of its weight. The Bessel's points P1, P2 are distanced from the ends of a ruler—in the example from the ends of the linear guide 1—by approximately 0.21 to 0.23 of the total length 1.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A measuring system for measuring the accuracy of the position and track of a machine element moved along a predetermined track, comprising:

a predetermined track along which a machine element moves relative thereto;

a measuring device for measuring the position of the machine element along the track;

the track comprises a guide of the measuring device, on which a carriage is guided along the track, wherein the machine element can be fastened to the carriage;

a component of the measuring device is fastened on the carriage;

a drive integrated with the measuring device that moves the carriage in a controlled manner along the guide into predetermined positions and at predetermined speeds; and a component of a laser alignment measuring device that is fastened on the carriage, said laser alignment measuring device comprising:

a laser; and a position-sensitive detector, wherein the laser alignment measuring device measures deviations in the position of the machine element transversely to the predetermined track and wherein the position-sensitive detector is fastened on the carriage and the laser alignment measuring device is stationary and fastened on a holder, wherein the holder does not have a rigid connection with the guide.

2. The measuring system in accordance with claim 1, wherein the measuring device comprises a laser interferometer.

3. The measuring system in accordance with claim 1, wherein the measuring device comprises a scale that is fastened to the guide and is scanned by a scanning head that is fastened on the carriage.

4. A measuring system for measuring the accuracy of the position and track of a machine element moved along a predetermined track, comprising:

a predetermined track along which a machine element moves relative thereto;

a measuring device for measuring the position of the machine element along the track;

the track comprises a guide of the measuring device, on which a carriage is guided along the track, wherein the machine element can be fastened to the carriage;

a component of the measuring device is fastened on the carriage; and a drive integrated with the measuring device that moves the carriage in a controlled manner along the guide into predetermined positions and at predetermined speeds, wherein the drive is fastened on a support that is exclusively supported at first and second Bessel points of the guide.

5. The measuring system in accordance with claim 4, wherein the support is rigidly connected to the guide at the first Bessel point; and a linear bearing acting in the longitudinal direction of the guide is provided at the second Bessel point between the support and the guide.

6. A measuring system for measuring the accuracy of the position and track of a machine element moved along a predetermined track, comprising:

a predetermined track along which a machine element moves relative thereto;

a measuring device for measuring the position of the machine element along the track;

the track comprise a guide of the measuring device, on which a carriage is guided along the track, wherein the machine element can be fastened to the carriage;

a component of the measuring device is fastened on the carriage;

a drive integrated with the measuring device that moves the carriage in a controlled manner along the guide into predetermined positions and at predetermined speeds;

a first mounting element connected to the guide so as to act rigidly in a longitudinal direction of the guide and so as to support the guide at a first Bessel point; and a second mounting element comprises a linear bearing acting in the longitudinal direction, wherein the second mounting element supports the guide at a second Bessel point.

7. The measuring system in accordance with claim 6, wherein each of the first and second mounting elements comprises a rotary bearing with an axis of rotation that is transverse to the longitudinal direction.

8. The measuring system in accordance with claim 7, further comprising:

a first support element fastened to the first mounting element; and a second support element fastened to the second mounting element, wherein the guide is pivotable around the axes of rotation of the rotary bearing of the first and second mounting elements in relation to the first and second support elements.

9. A measuring system for measuring the accuracy of the position and track of a machine element, which is seated, displaceable and/or rotatable in several axes in space, the measuring system comprising:

a guide that predetermines a track in space and along which a carriage is guided along the track;

a component of a measuring device is fastened on the carriage for measuring the position of the carriage along the track;

a drive integrated with the measuring device that displaces the carriage in a controlled manner along the guide into predetermined positions and at predetermined speeds;

a component of a laser alignment measuring device that is fastened on the carriage, the laser alignment measuring device comprising:

a laser; and a position-sensitive detector, wherein the laser alignment measuring device measures deviations in the position of the machine element transversely to the predetermined track;

wherein the carriage is rigidly coupled with the machine element in a plurality of axial directions to be tested, in which the machine element is seated, displaceable and/or rotatable in space and wherein the position-sensitive detector is fastened on the carriage and the laser alignment measuring device is stationary and fastened on a holder, wherein the holder does not have a rigid connection with the guide.

10. A measuring system for measuring the accuracy of the position and track of a machine element moved along a predetermined track, comprising:

a predetermined track along which a machine element moves relative thereto;

a measuring device for measuring the position of the machine element along the track;

the track comprises a guide of the measuring device, on which a carriage is guided along the track, wherein the machine element can be fastened to the carriage;

a component of the measuring device is fastened on the carriage;

a drive integrated with the measuring device that moves the carriage in a controlled manner along the guide into predetermined positions and at predetermined speeds; and a coupling mechanism between the-machine element and the carriage, wherein the coupling mechanism is rigid along a first set of axes in which the machine element is movable and wherein the coupling mechanism supplies a degree of freedom of movement for the machine element for all axes not of said first set of axes.

11. The measuring system in accordance with claim 10, wherein the coupling mechanism comprises a guide.

12. The measuring system in accordance with claim 10, wherein the coupling mechanism comprises a joint.

13. The measuring system in accordance with claim 10, wherein, the coupling mechanism comprises an air bearing.

* * * * *